(12) United States Patent
Donk et al.

(10) Patent No.: US 7,467,037 B2
(45) Date of Patent: Dec. 16, 2008

(54) OPERATOR CONTROL DEVICE FOR INDIVIDUALLY OPERATING A MOTOR VEHICLE DEVICE

(75) Inventors: Vera Donk, Babenhausen (DE); Guido Meier-Arendt, Langen (DE); Thomas Sulzbach, Offenbach (DE)

(73) Assignee: Siemens Aktiengesellschaft, Munich (DE)

( * ) Notice: Subject to any disclaimer, the term of this patent is extended or adjusted under 35 U.S.C. 154(b) by 477 days.

(21) Appl. No.: 11/209,041

(22) Filed: Aug. 23, 2005

(65) Prior Publication Data
US 2006/0095177 A1 May 4, 2006

(30) Foreign Application Priority Data
Aug. 25, 2004 (DE) .............. 10 2004 041 204
Jun. 29, 2005 (DE) .............. 10 2005 030 361

(51) Int. Cl.
*G06F 17/00* (2006.01)
(52) U.S. Cl. ............................. 701/36; 701/1
(58) Field of Classification Search .......... 701/36, 701/1; 340/500, 691.6
See application file for complete search history.

(56) References Cited

U.S. PATENT DOCUMENTS

| | | | |
|---|---|---|---|
| 5,270,689 A | 12/1993 | Hermann | |
| 6,005,299 A | 12/1999 | Hengst | |
| 6,707,387 B2 * | 3/2004 | Tosaka et al. | 340/691.6 |
| 6,769,320 B1 | 8/2004 | Bollgohn | |
| 2004/0046751 A1 | 3/2004 | Heimermann et al. | |

FOREIGN PATENT DOCUMENTS

| | | |
|---|---|---|
| DE | 3821004 A1 | 12/1989 |
| DE | 3836555 A1 | 5/1990 |
| DE | 19639119 A1 | 3/1998 |
| DE | 19944324 A1 | 3/2001 |
| DE | 10016180 A1 | 10/2001 |
| DE | 10035642 C1 | 12/2001 |
| DE | 10139693 A1 | 5/2002 |
| DE | 10121685 A1 | 11/2002 |
| EP | 0974192 B1 | 12/2001 |

* cited by examiner

*Primary Examiner*—Yonel Beaulieu
(74) *Attorney, Agent, or Firm*—Laurence A. Greenberg; Werner H. Stemer; Ralph E. Locher

(57) ABSTRACT

An operator control device for operating at least one electronic device in a motor vehicle contains a display panel for displaying at least one predefined operator control menu of the electronic device compiled of selectable operator control functions, a turn and press switch for selecting and setting one of the operator control functions and a first menu switch for calling a first user-specific operator control menu. The user-specific operator control menu can be compiled by a user on an individual basis according to his wishes from a subset of the selectable operator control functions and the subset of the selectable operator control functions is indicated graphically on the display panel.

20 Claims, 4 Drawing Sheets

Route has been calculated

OPERATOR CONTROL DEVICE FOR INDIVIDUALLY OPERATING A MOTOR VEHICLE DEVICE

CLAIM FOR PRIORITY

This application claims the benefit of priority to German Application No. 10 2004 041 204.9, filed in the German language on Aug. 25, 2004 and German Application No. 10 2005 030 361.7, filed in the German language on Jun. 29, 2005, the contents of which are hereby incorporated by reference.

TECHNICAL FIELD OF THE INVENTION

The invention relates to an operator control device for operating at least one electronic device in a motor vehicle.

BACKGROUND OF THE INVENTION

EP 0 974 192 B1 discloses a method for creating and storing user-specific operator control menus for a radio receiver. The operator control device of the radio receiver contains a display panel and a total of six selection keys which are arranged on the left and right along the display. Selection keys of this type are also referred to as soft keys. Each of these selection keys can be assigned a specific operator control function by a user, with a separate operator control element being provided for storing the individual operator control functions. Furthermore, next to the display panel a menu key is arranged with which the individual operator control functions are called and respectively displayed next to the associated selection key on the display panel.

The arrangement of in each case one selection key for each operator control function is costly and requires considerable installation space. In addition, the specific operator control element is necessary for assigning the individual operator control function to the respective selection key with whose method of functioning the user has to particularly concern himself. Furthermore, the arrangement of the selection keys next to the display panel means that the display panel has to be positioned at the same location as the selection keys.

SUMMARY OF THE INVENTION

The object of the invention is therefore to provide an operator control device of the type mentioned at the beginning which saves space and can be activated in an ergonomically advantageous fashion.

This object is achieved according to the invention in that only a single turn and press switch with which operator control functions both from the predefined operator control menu and from the user-specific operator control menu are selected and set is provided. Selection is understood here to mean the highlighting of the desired operator control function, for example by means of a moving frame, which is brought about by activating the rotational function of the turn and press switch. The rotational function may be implemented continuously here or with haptic feedback in the form of latching partitions which are distributed around the circumference. The operator control function which is selected with the rotational function is then set by activating the pressing function, and thus activated. Operator control menus which are permanently predefined in terms of their composition at the manufacturer's are considered to be predefined operator control menus.

In addition to the selection and setting of the operator control functions, the turn and press switch is used to assign desired operator control functions to the user-specific operator control menu. Furthermore, a menu switch, referred to as the first menu switch, with which the user-specific operator control menu can be called in a selective way, is also provided as a further operator control element.

Owing to the reduction in the number of operator control elements to a turn and press switch and a menu switch, an operator control device is provided which is easy to understand, requires only a small amount of installation space and can be handled easily by a user since there is no need to search for the respective selection key for the desired operator control function. For this reason, the operator control device is particularly suitable for the field of motor vehicles because the amount of time for which a driver is distracted from observing the events on the road is reduced.

In order to support the user of the operator control device further, a preselection of operator control functions, which can be appropriately assigned to the individual, user-specific operator control menu, is already made. These are, for example, operator control functions which generally have to be used frequently, or operator control functions which are mainly required in situations in which the user, and thus in a normal case the driver, only has a small amount of time available to search through multi-level operator control menus. The preselected operator control functions are considered to be a subset of all the selectable operator control functions and are indicated graphically on the display panel. The user-specific operator control menu is thus additionally made easy to create since on the one hand the possible candidates for the user-specific operator control menu can be detected quickly and assigned to it by activating the turn and press switch, and since, on the other hand, frequent resorting and reassignment of the user-specific operator control menu can be dispensed with since an appropriate preselection has already been made.

In one embodiment, the subset is indicated by the selectable operator control functions which are associated with the subset being individually graphically highlighted in comparison with the other operator control functions within the at least one predefined operator control menu. This may be done by means of differences in color or lettering or by outlining or illuminating the text of the operator control function.

In one alternative refinement, the subset of selectable operator control functions is compiled to form a group and is indicated as a group within the at least one predefined operator control menu or can be called as a group and displayed on the display panel. Within the at least one predefined operator control menu, the group can be highlighted in its entirety by color or by means of a frame. For example when there are a plurality of predefined operator control menus, there may be provision for the group to be called separately as a submenu item of a predefined operator control menu in order to create the user-specific operator control menu directly from the group. The operator control functions which are associated with the group are present twice in this case; once within the callable group and additionally within the respectively associated, predefined operator control menu or menus.

In one refinement of the invention, an operator control function which is not associated with the subset is automatically assigned to the subset after a predefined number of calls. In this way, functions, which, contrary to the original assumptions, are called particularly frequently can also be subsequently classified as a possible operator control function for the user-specific operator control menu and correspondingly characterized graphically by assignment to the subset. It is thus suggested to the user that he should assign this frequently used function to the user-specific operator control menu and thus simplify access to it. Depending on the type of operator control function, the number of calls may be detected here only during one journey of the motor vehicle or over a plurality of journeys.

In order to take into account a change in the operator control behavior of the user, in one development it is proposed that an operator control function which is associated with the subset be deleted from the subset after a predefined number of journeys of the motor vehicle without this function having been called. Here too, the number of journeys depends again on the type of function. For example, the navigation system is frequently only called for a route calculation once per journey so that the failure of the route calculation to be called once should not already cause this function to be deleted. Removing operator control functions which have not been used for a relatively long time from the user-specific operator control menu has the advantage that the operator control menu is adapted in each case to the current requirements of the user and the operator control menu is prevented from being overfilled with unused functions.

In order to be able to generate the user-specific operator control menu easily, in one refinement a submenu is called from the at least one predefined operator control menu after an operator control function which is associated with the subset has been selected and set, and said submenu is displayed on the display panel. The submenu contains, as a menu item, the transmission of the operator control function into the first user-specific operator control menu. The user can therefore decide at any time during a normal operator control process within a predefined operator control menu to add a further function to the user-specific operator control menu.

There is advantageous provision in one development for the operator control functions which are assigned to the first user-specific operator control menu to be sorted automatically in the user-specific operator control menu in accordance with the frequency with which they have been called from the user-specific operator control menu. As a result, the operator control function which is used most frequently can be accessed most quickly by the user. Furthermore, depending on the frequency of use, the user can concentrate on the start, the middle or end of the operator control menu when searching for the operator control function which is desired at a particular time. If a plurality of operator control functions happen to be used very frequently and the user-specific operator control menu happens to already have a relatively large number of entries, there is provision for a submenu to be provided within the user-specific operator control menu, in which case the functions which are called most frequently are compiled automatically in the submenu.

In one embodiment of the invention, the user-specific operator control menu is called and displayed on the display panel by activating the first menu switch a first time. By activating the first menu switch a second time, the user-specific operator control menu is removed from the display and the at least one predefined operator control menu is displayed on the display panel. The first menu switch can therefore be used to toggle between the two types of operator control menu.

As an alternative, the operator control device contains a second menu switch whose activation causes the at least one predefined operator control menu to be called and displayed on the display panel. This embodiment is advantageous in particular if a comparatively large number of different electronic vehicle devices are to be operated by means of the operator control device and in this context each vehicle device is to be assigned a separate predefined operator control menu. In this case, it may be felt to be tedious to have to firstly search through for the respective predefined operator control menu, for which reason it is possible to provide a separate menu switch for each vehicle device, the activation of which switch causes the associated predefined operator control menu to be called. If each vehicle device is additionally assigned a separate user-specific operator control menu, the same user-specific operator control menu which is associated with the vehicle device of the predefined operator control menu called last could always be called after the first menu switch has been activated.

When there are a plurality of vehicle devices and associated user-specific operator control menus, it is proposed as an alternative embodiment that when the first menu switch is activated a first time the first user-specific operator control menu is called and displayed on the display panel, and in that when the first menu switch is activated a second time the second user-specific operator control menu is called and displayed on the display panel. This series may be continued as desired, i.e. whenever the first menu switch is activated the system jumps to the respective next user-specific operator control menu.

In one expansion, a user identification device and a memory device are provided. In the memory device, which is preferably a chip card, the first and/or the second user-specific operator control menus are assigned to a first user and at least one further user-specific operator control menu is stored and assigned to a second user. The user identification device identifies whether the first or the second user is currently using the operator control device and causes the assigned, user-specific operator control menu or menus to be correspondingly loaded into the operator control device by the memory device.

The user identification device identifies here either which user is currently functioning as a driver, for example by means of a person-related chip card or whether the operator control device is operated by a user on a driver's seat or by a user on a front passenger seat of the motor vehicle. In both cases it is thus ensured that the user-specific operator control menu or menus remain assigned to the individual users on an entirely individual basis and to prevent, as a result of the user changing and the operator control behavior correspondingly changing, automatic adaptations from being made to the operator control menu which impede the original user when the system changes back to him.

By eliminating the selection keys which are arranged next to the display panel it is possible to arrange the first menu switch and/or the turn and press switch at a location which is spatially removed from the display panel. The menu switch and/or the turn and press switch are preferably located on the center console of the motor vehicle, while the display panel is arranged on the instrument panel. The menu switch and the turn and press switch are thus easier for the driver to reach and can also be distinguished from one another on the basis of their different shape, without looking. The operator control is thus made significantly easier.

In order to be able to perceive acoustically the respectively selected operator control menu, a voice output of the selected operator control menu can be triggered by an activation of the menu switch.

The vehicle devices which can be operated by means of the operator control device are preferably an audio device, a navigation device or a telephone device or a diagnostic device of the motor vehicle.

BRIEF DESCRIPTION OF THE DRAWINGS

An exemplary embodiment of the invention is illustrated in the drawing and will be described in more detail in the text which follows. In the drawing.

DETAILED DESCRIPTION OF THE INVENTION

Figure 1:
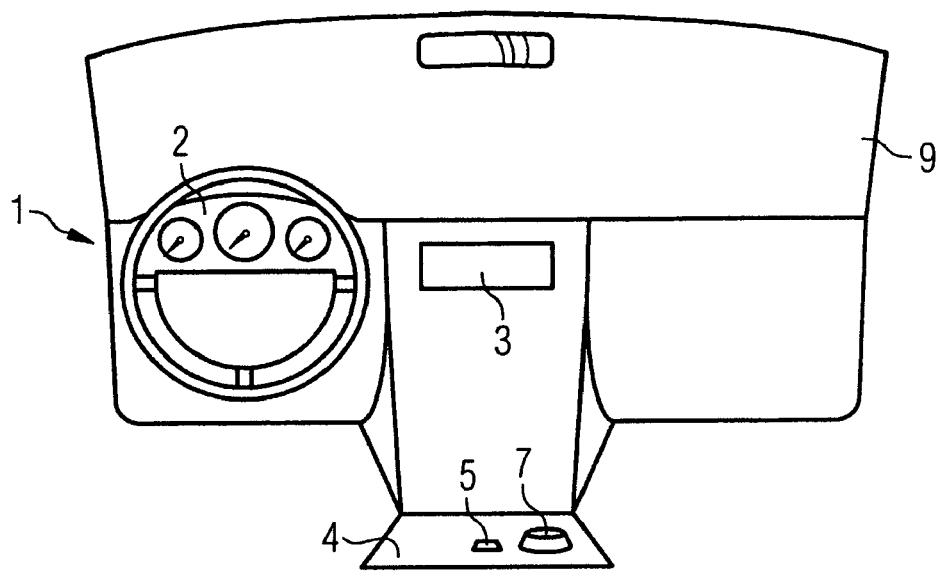
FIG. 1 is a view of the cockpit of an internal combustion engine having a switched-off operator control device.

The instrument panel 1 (illustrated in FIGS. 1 and 2) of a motor vehicle has a combination instrument 2 on the driver's side.

A windshield 9 is arranged above the instrument panel 1, and a display panel 3 is arranged in the central region of the instrument panel 1 at the level of the combination instrument 2. Furthermore, a menu switch 5 which is embodied as a momentary contact switch is arranged on a center console 4 between the driver's side and the front seat passenger's side, and a turn and press switch 7 is arranged next to said menu switch 5, said switches 5, 7 constituting, together with the display panel 3, an operator control device for an audio system, a telephone system, a navigation device and a diagnostic device of the motor vehicle.

Figure 2:
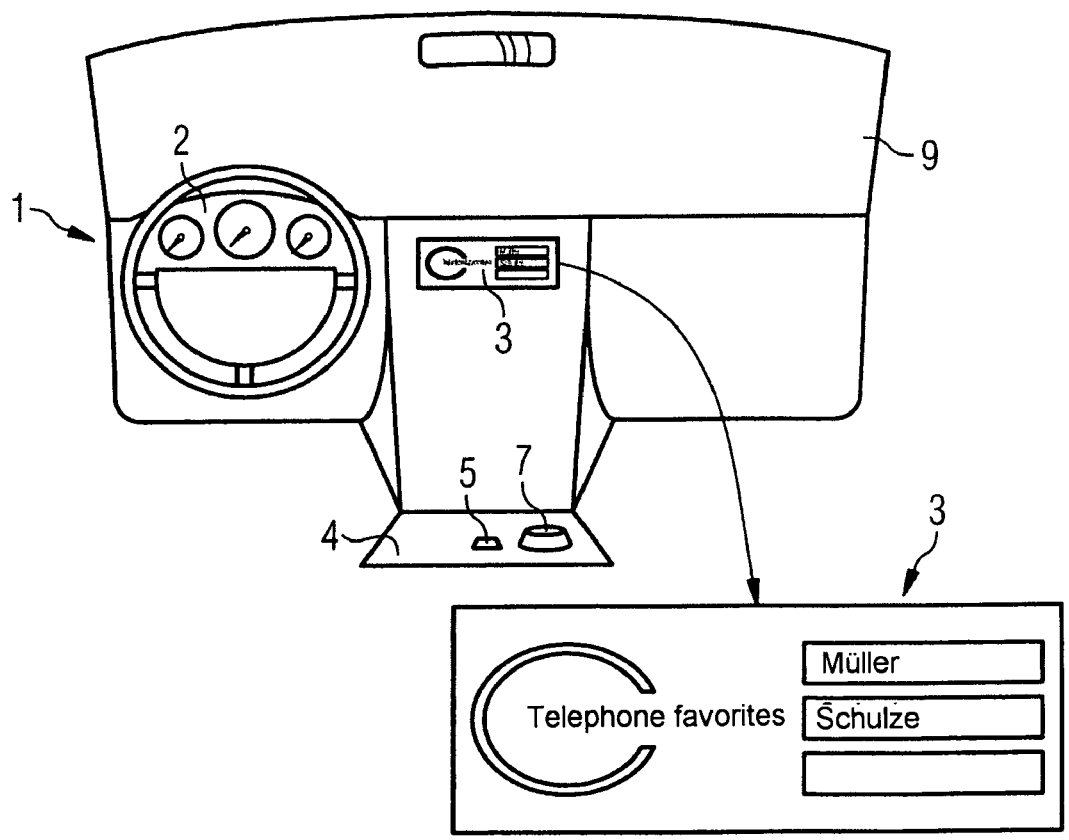
FIG. 2 shows the cockpit according to FIG. 1 with operator control device switched on and a display panel which is illustrated in a separately enlarged view.

The entire operator control device and thus also the display panel 3 are not switched on in FIG. 1, while said operator control device is switched on in FIG. 2 and the display panel 3 next to the illustration of the instrument panel 1 is illustrated in an enlarged view once more.

Figure 3:
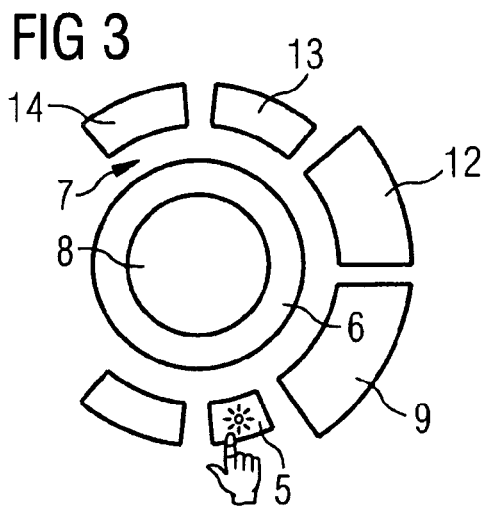
FIG. 3 shows a plan view of an operator control unit of the operator control device according to FIG. 1 when the operator control menu is being selected.

FIG. 3 shows a switch combination which is composed of the turn and press switch 7 and a plurality of menu switches 5, 9, 12, 13 and 14 arranged next to it. The turn and press switch 7 has a central pressure element 8 which is surrounded by a rotational ring 6. The rotational ring 6 assumes four latching positions during one revolution.

The menu switch 5 is a first menu switch for calling a user-specific operator control menu. The second menu switch 9 is used to call a predefined operator control menu for operating the audio system, while the predefined operator control menus of the telephone system, the navigation device and the diagnostic device are called using the further menu switches 12, 13 and 14.

Figure 4:
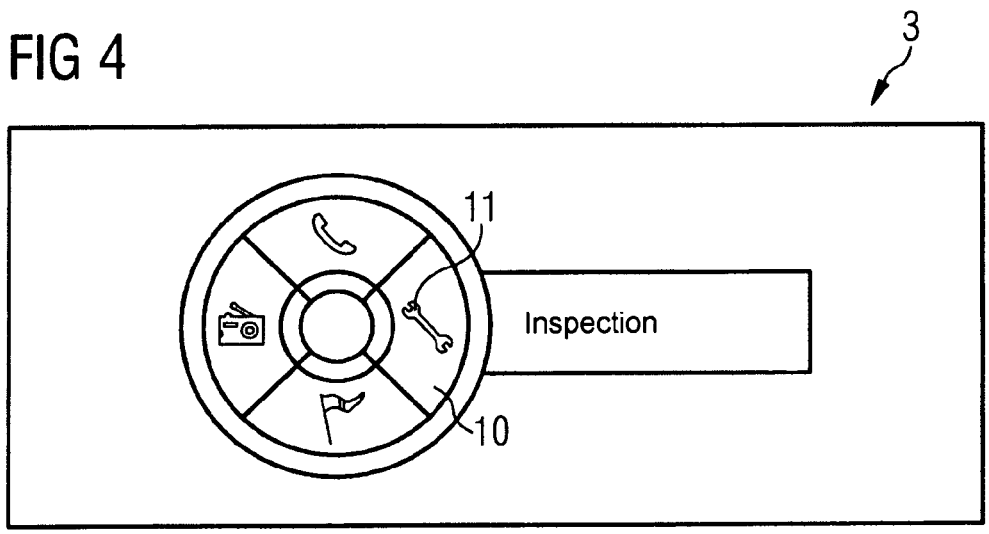
FIG. 4 shows a view of the display panel of the operator control device according to FIG. 1 after the operator control menu has been selected.

When the first menu switch 5 is activated, the user-specific operator control menu is called and displayed on the display panel 3 in accordance with FIG. 4. This is done by means of sector-like fields 10 which form a ring, of which each field 10 is assigned to an operator control function and is provided with a suitable symbol 11. In this specific embodiment, in each case only one user-specific operator control function is provided for each of the four vehicle devices, and this is expressed by means of the symbols. Alternatively, each symbol can represent the further branching to a submenu which is assigned to the respective vehicle device. A telephone receiver for the user-specific operator control function of the telephone system, a radio for the user-specific operator control function of the audio system, a flag for the user-specific operator control function of the navigation device and as for the user-specific operator control function of the diagnostic device can be seen as symbols. In this example, the driver of the motor vehicle has compiled the following user-specific operator control functions: The most frequently dialed telephone number, the preferred radio transmitter, a destination of the navigation system which is traveled to from time to time but is awkward to reach and the display of the service state of the motor vehicle.

Figure 5:
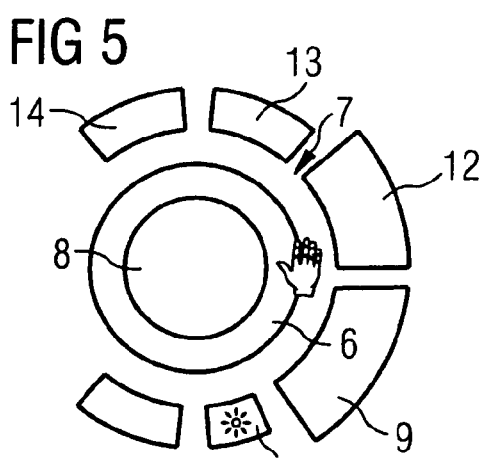
FIG. 5 shows the operator control unit according to FIG. 3 when an operator control function is being set.
Figure 6:
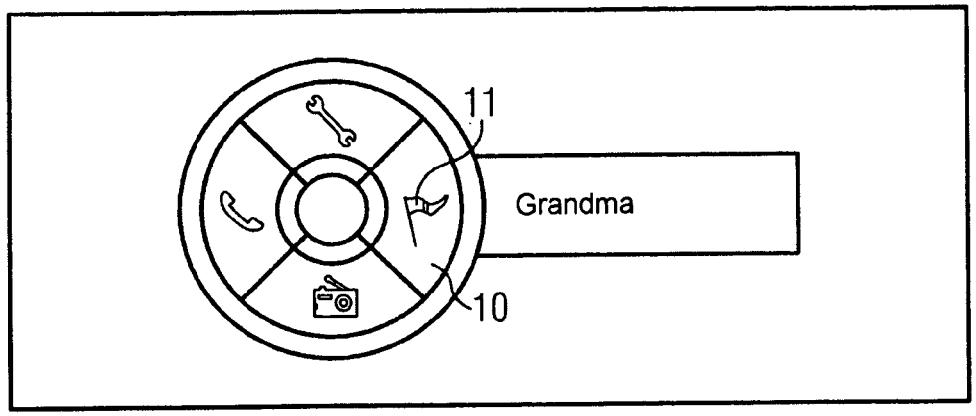
FIG. 6 shows the display panel according to FIG. 4 when the operator control function has been set.

By turning the rotational ring 6 it is possible to select the desired operator control function, as shown by FIG. 5 and is then illustrated correspondingly on the display panel 3 in FIGS. 4 and 6. By displaying the user-specific operator control menu as sector-like fields which form a ring, the assignment between the operator control function and the latched position of the turn and press switch can be perceived particularly easily.

Starting from the service display indicating that an inspection of the motor vehicle is due (FIG. 4) the navigation destination "grandma" has been selected, this being indicated by corresponding lettering in FIG. 6.

Figure 7:
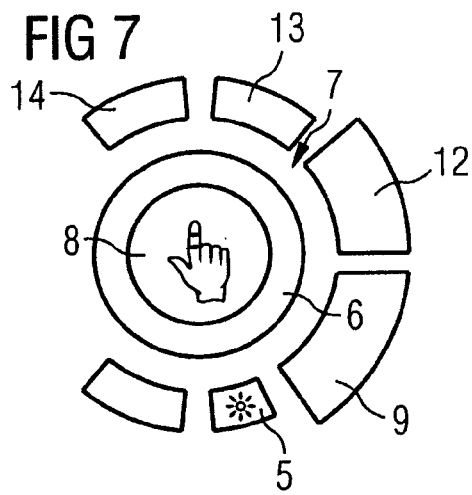
FIG. 7 shows the operator control unit according to FIG. 3 when the turn and press switch is being activated.
Figure 8:
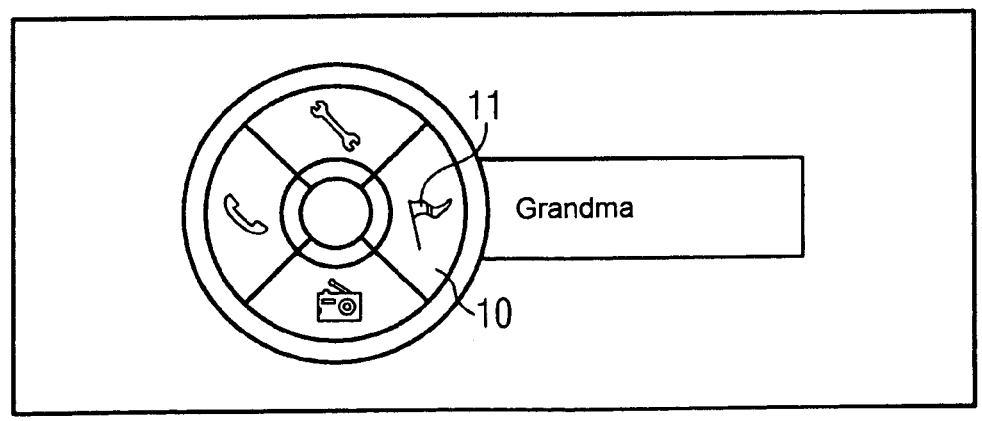
FIG. 8 shows the display panel according to FIG. 4 when the set operator control function is being activated.

In order to activate the selected operator control function and thus cause it to be executed, the pushbutton element 8 is pressed according to FIG. 7. When the pushbutton element 8 is activated, the associated field 10 with the navigation symbol is highlighted by lighting up (FIG. 8).

Figure 9:
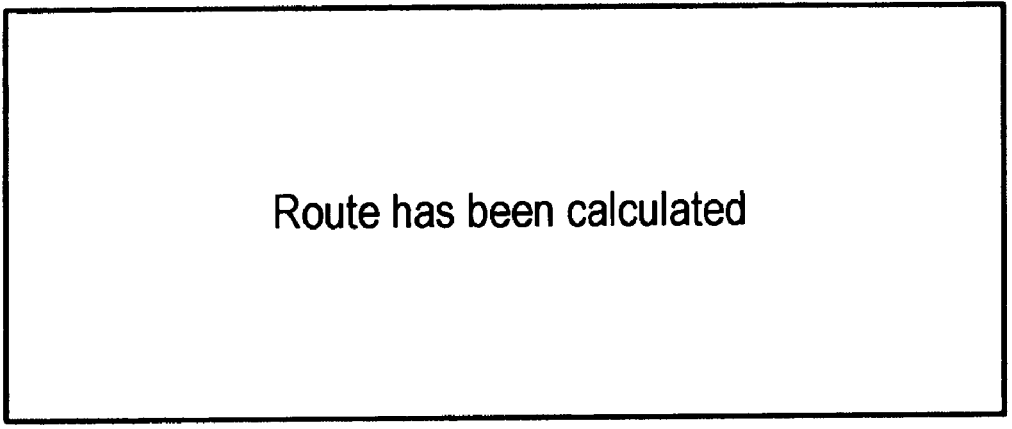
FIG. 9 shows the display panel according to FIG. 4 after the operator control function has been carried out.

The execution of the selected operator control function is then specified on the display panel 3 by lettering (FIG. 9). In the present case of the selection of the destination "grandma", the route to the destination "grandma" is calculated by means of the navigation device and the end of the calculation of the route is indicated in the display panel 3.

The invention claimed is:

1. An operator control device for operating at least one electronic device in a motor vehicle, comprising:
    a display panel configured to display at least one predefined operator control menu and a first user-specific operator control menu, the predefined operator control menu including selectable operator control functions;
    a turn and press switch configured to select one of the selectable operator control functions thereby defining a selected one of the selected operator control functions, the turn and press switch being configured to set the selected one of the selectable operator control functions; and
    a first menu switch for calling the first user-specific operator control menu;
    wherein the display panel is configured to graphically display a subset of the selectable operator control functions, and the turn and press switch is configured to enable a user to create the first user-specific operator control menu by individually selecting one or more operator control functions from the subset of the selectable operator control functions.

2. The operator control device according to claim 1, wherein the selectable operator control functions which are associated with the subset are individually graphically highlighted in comparison with the other operator control functions within the at least one predefined operator control menu.

3. The operator control device according to claim 1, wherein the subset of selectable operator control functions is compiled to form a group and is indicated as a group within the at least one predefined operator control menu or can be called as a group and displayed on the display panel.

4. The operator control device according to claim 1, wherein an operator control function which is not associated with the subset is automatically assigned to the subset after a predefined number of calls.

5. The operator control device according to claim 1, wherein an operator control function which is associated with the subset is deleted from the subset after a predefined number of journeys of the motor vehicle without this function having been called.

6. The operator control device according to claim 1, wherein after an operator control function which is associated with the subset has been selected and set, a submenu is called from the at least one predefined operator control menu and displayed, said submenu containing as a menu item the transmission of the operator control function into the first user-specific operator control menu.

7. The operator control device according to claim 1, wherein the operator control functions which are assigned to the first user-specific operator control menu are sorted automatically in the user-specific operator-control menu in accordance with the frequency with which they have been called from the user-specific operator menu.

8. The operator control device according to claim 1, wherein the first user-specific operator control menu is called and displayed on the display panel by activating the first menu switch a first time, and in that by activating the first menu switch a second time the user-specific operator control menu is removed from the display and the at least one predefined operator control menu is displayed on the display panel.

9. The operator control device according to claim 1, wherein the operator control device contains a second menu switch whose activation causes the at least one predefined operator control menu to be called and displayed on the display panel.

10. The operator control device according to claim 1, wherein a further device is provided and is connected to the operator control device, and in that a second user-specific operator control menu which is assigned to the further electronic device can be created.

11. The operator control device according to claim 10, wherein when the first menu switch is activated a first time the first user-specific operator control menu is called and displayed on the display panel, and in that when the first menu switch (is activated a second time the second user-specific operator control menu is called and displayed on the display panel.

12. The operator control device according to claim 1, further comprising a memory device in which the first and/or the second user-specific operator control menu are assigned to a first user and in which at least one further user-specific operator control menu is stored and is assigned to a second user, and
   in that a user identification device identifies whether the first or the second user is currently using the operator control device, and the assigned user-specific operator control menu or menus is correspondingly loaded into the operator control device by the memory device.

13. The operator control device according to claim 12, wherein the memory device is a chip card.

14. The operator control device according to claim 12, wherein the user identification unit can detect whether the operator control device is being operated by an operator on a driver's seat or by an operator on a front passenger seat of the motor vehicle.

15. The operator control device according to claim 1, wherein the first menu switch and/or the turn and press switch are arranged on the center console of a motor vehicle.

16. The operator control device according to claim 1, wherein the display panel is arranged on the instrument panel of a motor vehicle.

17. The operator control device according to claim 1, wherein a voice output of the selected operator control menu can be triggered by activating the first menu switch.

18. The operator control device according to claim 1, wherein the electronic device and/or the further electronic device is an audio device, navigation device or telephone device or a diagnostic device.

19. The operator control device according to claim 1, wherein the turn and press switch includes a center press switch and a turn switch that is rotatable about the press switch, the turn switch is configured to select the selected one of the selected operator control functions upon being rotated, and the press switch is configured to activate the selected one of the selectable operator control functions upon being pressed.

20. The operator control device according to claim 1, in combination with a chip card, wherein the operator control device is configured to load the first user-specific operator control menu or a second user-specific operator control menu depending on information stored in the chip card.

* * * * *